United States Patent [19]

Ficker

[11] Patent Number: 5,173,536
[45] Date of Patent: Dec. 22, 1992

[54] IMPACT POLYMER BLEND

[75] Inventor: Harold K. Ficker, Wayne, N.J.

[73] Assignee: Union Carbide Chemicals & Plastics Technology Corporation, Danbury, Conn.

[21] Appl. No.: 625,543

[22] Filed: Dec. 11, 1990

[51] Int. Cl.$^5$ .................... C08L 23/10; C08L 53/00
[52] U.S. Cl. ............................ 525/88; 525/240; 525/211
[58] Field of Search .................. 525/88, 240

[56] References Cited

U.S. PATENT DOCUMENTS

| | | | |
|---|---|---|---|
| 4,459,385 | 7/1984 | McCullough | 525/88 |
| 4,621,114 | 11/1986 | Watanabe | 525/88 |
| 4,634,735 | 1/1987 | Thiersault et al. | 525/88 |
| 4,732,940 | 3/1988 | Yamaoka et al. | 525/240 |
| 4,748,206 | 5/1988 | Nogiwa et al. | 525/88 |
| 4,843,129 | 6/1989 | Spenadel et al. | 525/88 |
| 4,882,380 | 11/1989 | Ficker et al. | 525/53 |
| 5,026,778 | 6/1991 | Fujii | 525/240 |

FOREIGN PATENT DOCUMENTS 170255  5/1986  European Pat. Off. .
58-157839  9/1983  Japan .

Primary Examiner—Carmen J. Seccuro, Jr.
Attorney, Agent, or Firm—Saul R. Bresch

[57] ABSTRACT

A blend comprising:

(a) an isotactic polypropylene matrix containing an ethylene/propylene copolymer dispersed phase, said combination having dual melting peaks, a first peak in the range of about 150° C. to about 165° C., attributable to the matrix, and a second peak in the range of about 123° C. to about 132° C. having at least about 2.2 calories per gram melting endotherm, attributable to the copolymer, component (a) being present in the blend in an amount of about 60 to about 90 percent by weight based on the weight of the blend; and (b) an ethylene/1-butene copolymer containing about 85 to about 90 percent by weight ethylene; having a density in the range of about 0.890 to about 0.910 gram per cubic centimeter; and having an Mw/Mn ratio of up to about 8, component (b) being present in the blend in an amount of abut 10 to about 40 percent by weight based on the weight of the blend.

11 Claims, No Drawings

IMPACT POLYMER BLEND

TECHNICAL FIELD

This invention relates to a blend of polymers having exceptionally high impact strength.

BACKGROUND INFORMATION

Polypropylene homopolymers have been commercially produced since the early 1960s and have found wide application in molded articles, especially where a higher degree of heat resistance is required than is achievable by high density polyethylene compositions. Polypropylene homopolymers, however, suffer one significant drawback in that they are brittle at temperatures below approximately 10° C. To overcome this problem, elastomeric components are typically blended or polymerized in situ, in a separate reactor, with the polypropylene homopolymer (or a propylene copolymer) to form what is referred to as an "impact polypropylene copolymer". In the in situ polymerization, this amounts to having an ethylene/propylene copolymer incorporated into a matrix of propylene homopolymer or copolymer. These impact polypropylene copolymers exhibit improved levels of low temperature impact strength. By choosing the correct compositional parameters, formulations with high impact strengths at low temperatures, having minimal loss in other properties, such as stiffness, can be achieved. Nevertheless, these formulations exhibit one very undesirable property known in the art as "stress whitening". This phenomena occurs when an impact polypropylene copolymer is impacted or stressed, and results in a whitened area distinctly noticeable in a molded article. Obviously, these marks are not acceptable in consumer items such as housewares, automobile interiors, and appliances. Because of the stress whitening problem, a technology has been developed to overcome the difficulty, and improvements have been achieved. These improvements, however, are realized at some sacrifice in impact strength and/or stiffness, or require the use of costly multiple (more than two) reactor systems.

For example, excellent stress whitening resistance can be accomplished in a three reactor process using various combinations of ethylene and propylene, but the third reactor increases production costs to prohibitive levels.

Excellent stress whitening resistance is considered to be measurably below 0.1 inch when an injection molded disc is impacted at ten inch-pounds, and the resulting white mark is measured after 24 hours of aging.

U.S. Pat. No. 4,882,380 teaches a process, which also results in a product having excellent stress whitening resistance and, in addition, higher stiffness. The low temperature impact strength, while satisfactory, particularly with regard to Gardner impact strength (the falling weight test - ASTM D-3029, Condition G), is somewhat deficient, however, insofar as "notch sensitivity" or Izod impact strength (also referred to as "notched Izod"), as measured by ASTM D-256, is concerned. In certain applications such as molded articles having sharp corners or notched or textured surfaces, it is desirable, however, to provide an even higher Izod impact strength even if some stiffness is sacrificed.

DISCLOSURE OF THE INVENTION

An object of this invention, therefore, is to provide a composition having improved low temperature Izod impact strength while maintaining the high level of stress whitening resistance previously attained as well as satisfactory Gardner impact strength and stiffness.

Other objects and advantages will become apparent hereinafter.

According to the present invention, the above object is met by a blend comprising:

(a) an isotactic polypropylene matrix containing an ethylene/propylene copolymer dispersed phase, said combination having dual melting peaks, a first peak in the range of about 150° C. to about 165° C., attributable to the matrix, and a second peak in the range of about 123° C. to about 132° C. having at least about 2.2 calories per gram melting endotherm, attributable to the copolymer, component (a) being present in the blend in an amount of about 60 to about 90 percent by weight based on the weight of the blend; and (b) an ethylene/1-butene copolymer containing about 85 to about 90 percent by weight ethylene; having a density in the range of about 0.890 to about 0.910 gram per cubic centimeter; and having an Mw/Mn ratio of up to about 8, component (b) being present in the blend in an amount of about 10 to about 40 percent by weight based on the weight of the blend.

DETAILED DESCRIPTION

Component (a) is an impact polypropylene copolymer, which can be, and is preferably, prepared by the process described in U.S. Pat. No. 4,882,380.

The process is briefly described as follows:

(i) contacting propylene or propylene and at least one alpha-olefin having 2 or 4 to 8 carbon atoms, and hydrogen, wherein the alpha-olefin is present in a ratio of about 0.01 to about 0.06 mole of alpha-olefin per mole of propylene and the hydrogen is present in a ratio of about 0.001 to about 0.45 mole of hydrogen per mole of combined propylene and alpha-olefin, with a catalyst comprising (i) a catalyst precursor, which includes titanium, magnesium, chlorine, and an electron donor; (ii) a hydrocarbylaluminum cocatalyst; and (iii) a selectivity control agent, which is different from the electron donor, in a first reactor in such a manner that a mixture of a homopolymer of propylene or a copolymer of propylene and alpha-olefin together with active catalyst is produced;

(ii) passing the mixture from step (a) into a second reactor; and (iii) adding to the second reactor (A) a sufficient amount of ethylene and propylene to provide ethylene/propylene copolymer in an amount of about 20 percent to about 45 percent by weight, based on the weight of the product, said ethylene and propylene being introduced in a ratio of about 10 to about 100 moles of ethylene per mole of propylene; and (B) hydrogen in a mole ratio of about 0.1 to about 1.0 mole of hydrogen per mole of combined ethylene and propylene; and (iv) effecting the copolymerization of ethylene and propylene in the second reactor in such a manner that the product is produced.

As in this process, the polypropylene prepared in the first reactor, i.e., the isotactic polypropylene, can be either a homopolymer or a copolymer of propylene and one or more alpha-olefins having 3 to 8 carbon atoms. It is noted that the term "copolymer" means a polymer based on two or more comonomers.

The product made in the first reactor (see step (i)) is an isotactic polypropylene homopolymer or copolymer having a melting point in the range of about 150° C. to about 165° C. and preferably in the range of about 155° C. to about 160° C.

The product made in the second reactor (component (a)) is a combination of the isotactic polypropylene from the first reactor, which is referred to as a matrix, and an ethylene/propylene copolymer prepared in the second reactor and dispersed throughout the matrix (referred to as a dispersed phase). The combination has dual melting peaks, one peak in the range of about 150° C. to about 165° C., attributable to the matrix, and one peak in the range of about 123° C. to about 132° C., preferably about 125° C. to about 130° C., having at least about 2.2 calories per gram melting endotherm, and preferably at least about 3 calories per gram melting endotherm. The melting endotherm represents the energy required to melt the ethylene/propylene copolymer crystalline fraction, and is symbolized by the expression $\Delta H$.

Component (b) is a very low density polyethylene, which can be referred to as VLDPE. The ethylene/1-butene copolymer can include additional comonomers such as alpha-olefins having 3 to 12 carbon atoms or dienes. The dienes can be conjugated or non-conjugated dienes containing 5 to 25 carbon atoms such as 1,4-pentadiene, 1,4-hexadiene, 1,5-hexadiene, dicyclopentadiene, 4-vinyl cyclohexene, 1-vinyl-1-cyclopentene, and the alkylbicyclononadienes, indenes, and norbornenes. Ethylidene norbornene is an example of the latter. The non-conjugated dienes are preferred.

The ethylene/1-butene copolymers can be produced by conventional techniques using, for example, a titanium or a vanadium based catalyst system.

With respect to the titanium based catalyst system, the respective comonomers are typically contacted with a catalyst system containing a catalyst precursor comprising magnesium, titanium, a halogen, and an electron donor as well as one or more aluminum containing compounds such as triethylaluminum and triisobutylaluminum. The catalyst system and the preparation of the copolymer are described in U.S. Pat. No. 4,302,565.

With regard to the vanadium based catalyst system, the respective comonomers are preferably contacted with a supported catalyst system containing a catalyst precursor comprising a vanadium trihalide, an electron donor, and a hydrocarbyl aluminum halide together with a hydrocarbyl aluminum cocatalyst and a halogen substituted lower alkane promoter, the lower alkane promoter having 1 to 7 carbon atoms. The catalyst system and a process for preparing the copolymer are described in European Patent Application 0 120 501.

The portion of the copolymer attributed to 1-butene is in the range of about 10 to about 20 percent by weight based on the weight of the copolymer and is preferably in the range of about 10 to about 15 percent by weight. The portion of the copolymer based on ethylene is greater than about 80 percent by weight and is preferably more than 85 percent by weight. Where additional comonomers are used, the portion based on these comonomers is in the range of about 1 to about 10 percent by weight.

The density of the ethylene/1-butene copolymer is in the range of about 0.890 to about 0.910 gram per cubic centimeter and is preferably in the range of about 0.895 to about 0.908 gram per cubic centimeter. The melt index is in the range of about 0.5 to about 2 grams per ten minutes. Melt index is determined in accordance with ASTM D-1238, Condition E, and is measured at 190° C.

The molecular weight distribution as represented by the ratio $Mw/Mn$ is up to about 8 and preferably no greater than about 4. $Mw$ is the weight average molecular weight and $Mn$ is the number average molecular weight. The $Mw/Mn$ ratio or polydispersity is a measure of the breadth of the molecular weight distribution. Polydispersity is determined by size exclusion chromatography.

In the blend, component (a), i.e., the impact polypropylene copolymer, can be present in an amount of about 60 to about 90 percent by weight based on the weight of the blend, i.e., components (a) and (b) combined, and is preferably present in an amount of about 75 to about 85 percent by weight. Component (b), i.e., the VLDPE, can be present in an amount of about 10 to about 40 percent by weight based on the weight of the blend, and is preferably present in an amount of about 15 to about 25 percent by weight. The optimum concentration is about 80 percent by weight of component (a) and about 20 percent by weight of component (b).

Various conventional additives can be added in conventional amounts to the blend. Typical additives are antioxidants, ultraviolet absorbers, antistatic agents, pigments, slip agents, fire retardants, stabilizers, cross-linking agents, halogen scavengers, smoke inhibitors, cross-linking boosters, processing aids, lubricants, plasticizers, viscosity control agents, fillers, and nucleating agents.

The patents and patent applications mentioned in this specification are incorporated by reference herein.

The invention is illustrated by the following examples.

EXAMPLES 1 TO 32

Component (a), the impact polypropylene copolymer, is prepared in accordance with the process described above and in U.S. Pat. No. 4,882,380. The process conditions and the physical properties of the product of the second reactor, i e., the impact polypropylene copolymer, are set forth in Table I.

Various blends and their physical properties are set forth in Table II.

TABLE I

| Example | 1 | 2 | 3 | 4 | 5 | 6 |
|---|---|---|---|---|---|---|
| Reactor I Conditions: | | | | | | |
| temperature (°C.) | 65 | 80 | 65 | 65 | 65 | 65 |
| pressure (psia) | 440 | 440 | 440 | 440 | 440 | 440 |
| hydrogen/propylene molar ratio | 0.053 | 0.036 | 0.055 | 0.060 | 0.050 | 0.038 |
| hydrogen/ethylene molar ratio | — | — | — | — | — | — |
| fluidizing gas velocity (ft/sec) | 1 | 1 | 1 | 1 | 1 | 1 |

TABLE I-continued

| Reactor II Conditions: | | | | | | |
|---|---|---|---|---|---|---|
| temperature (°C.) | 70 | 70 | 70 | 70 | 70 | 70 |
| pressure (psia) | 240 | 165 | 165 | 165 | 240 | 165 |
| hydrogen/ethylene plus propylene molar ratio | 0.27 | 0.11 | 0.17 | 0.18 | 0.38 | 0.093 |
| ethylene/propylene molar ratio | 21 | 13 | 17 | 42 | 12 | 9 |
| reactor II/reactor I cocatalyst feed ratio | 0.80 | 0.14 | 0.62 | 0.86 | 0.86 | 0.3 |
| fluidizing gas velocity (ft/sec) | 1.2 | 1.2 | 1.2 | 1.2 | 1.2 | 1.2 |
| Physical Properties | | | | | | |
| Melt Flow (dg/min) | 3.8 | 1.6 | 6.3 | 5.5 | 4.9 | 1.8 |
| Secant Flexural Modulus (psi $\times 10^{-5}$) | 1.58 | 1.44 | 1.68 | 1.71 | 1.59 | 1.41 |
| Notched Izod - 23° C. (ft-lb/in) | 1 | 1.6 | 0.9 | 0.9 | 0.9 | 1.3 |
| 0° C. (ft-lb/in) | 0.5 | 0.8 | 0.5 | 0.5 | 0.4 | 0.8 |
| Gardner Impact Strength (in-lb) | 190 | 180 | 35 | 16 | 140 | 150 |
| Stress Whitening Resistance (in) | <0.1 | <0.1 | <0.1 | <0.1 | <0.1 | 0.2 |
| Tensile Yield Strength (psi) | 4340 | 3990 | 4540 | 4590 | 4300 | 4000 |
| Tensile Yield Elongation (%) | 8.3 | 9.3 | 8.4 | 8.4 | 8.3 | 9.4 |
| Vicat Softening Point (°C.) | 138 | 135 | 146 | 144 | 133 | 131 |
| Rockwell Hardness, R scale | 88 | 82 | 90 | 95 | 87 | 83 |
| Specular Gloss 60° (%) | 39 | 82 | 41 | 44 | 80 | 83 |
| Copolymer Fraction (%) | 27 | 28 | 15 | 18 | 28 | 28 |
| DSC m.p.: PE (°C.) | 127 | 127 | 127 | 128 | 127 | 126 |
| PP (°C.) | 160 | 160 | 160 | 158 | 160 | 160 |
| ΔH PE (cal/g) | 7.2 | 9.2 | 4 | 4.9 | 7.2 | 7.3 |

| Example | 7 | 8 | 9 | 10 | 11 |
|---|---|---|---|---|---|
| Reactor I Conditions: | | | | | |
| temperature (°C.) | 65 | 65 | 65 | 65 | 65 |
| pressure (psia) | 440 | 440 | 440 | 440 | 440 |
| hydrogen/propylene molar ratio | 0.064 | 0.059 | — | 0.04 | 0.03 |
| hydrogen/ethylene molar ratio | 49 | 41 | — | — | — |
| fluidizing gas velocity (ft/sec) | 1 | 1 | 1 | 1 | 1 |
| Reactor II Conditions: | | | | | |
| temperature (°C.) | 70 | 70 | 70 | 70 | 70 |
| pressure (psia) | 165 | 165 | 165 | 165 | 165 |
| hydrogen/ethylene plus propylene molar ratio | 0.19 | 0.17 | 0.17 | 0.17 | 0.048 |
| ethylene/propylene molar ratio | 15 | 14 | 31 | 31 | 1.2 |
| reactor II/reactor I cocatalyst feed ratio | 0.59 | 0.82 | 0.74 | 0.77 | 0.5 |
| fluidizing gas velocity (ft/sec) | 1.2 | 1.2 | 1.2 | 1.2 | 1.2 |
| Physical Properties | | | | | |
| Melt Flow (dg/min) | 7.2 | 3.2 | 3.2 | 2.9 | 1.6 |
| Secant Flexural Modulul (psi $\times 10^{-5}$) | 1.47 | 1.37 | 1.45 | 1.52 | 0.91 |
| Notched Izod - 23° C. (ft-lb/in) | 0.9 | 1.1 | 1.1 | 1.1 | 12.7 |
| 0° C. (ft-lb/in) | 0.5 | 0.7 | 0.6 | 0.6 | 6.4 |
| Gardner Impact Strength (in-lb) | 24 | 160 | 160 | 150 | >300 |
| Stress Whitening Resistance (in) | <0.1 | <0.1 | <0.1 | <0.1 | 0.42 |
| Tensile Yield Strength (psi) | 4230 | 4010 | 4190 | 4240 | — |
| Tensile Yield Elongation (%) | 9.3 | 10.1 | 9.3 | 9.3 | — |
| Vicat Softening Point (°C.) | 139 | 132 | 135 | 135 | — |
| Rockwell Hardness, R scale | 85 | 79 | 83 | 84 | — |
| Specular Gloss 60° (%) | 51 | 46 | 51 | 39 | — |
| Copolymer Fraction (%) | 15 | 23 | 23 | 22 | 33 |
| DSC m.p.: PE (°C.) | 125 | 125 | 128 | 127 | 118 |
| PP (°C.) | 154 | 153 | 154 | 155 | 158 |
| ΔH PE (cal/g) | 3.2 | 4.7 | 6.8 | 5.2 | 2.1 |

TABLE II

| Example | 12 | 13 | 14 | 15 | 16 | 17 | 18 | 19 | 20 | 21 | 22 |
|---|---|---|---|---|---|---|---|---|---|---|---|
| Isotactic Polypropylene (%) | 100 | — | — | — | — | — | — | — | — | — | — |
| In Situ Copolymer (%) | — | — | 100 | — | — | — | — | — | — | — | — |
| Impact Polypropylene Copolymer (%) | — | 100 | — | 95 | 90 | 85 | 80 | 95 | 90 | 85 | 80 |
| VLDPE (%) | — | — | — | 5 | 10 | 15 | 20 | 5 | 10 | 15 | 20 |
| Properties | | | | | | | | | | | |
| Melt Flow (g/10 min) | 4.2 | 3.9 | 4 | 3.7 | 3.5 | 3.3 | 3.4 | 3.8 | 3.8 | 3.8 | 3.7 |
| Secant Flexural Modulus (psi $\times 10^{-5}$) | 2 | 1.52 | 1.67 | 1.5 | 1.37 | 1.26 | 1.16 | 1.47 | 1.34 | 1.25 | 1.13 |
| Notched Izod - 23° C. (ft-lb/in) | 0.7 | 1 | 1.8 | 1.4 | 1.7 | 2.6 | 4 | 1.4 | 1.8 | 2.8 | 4.9 |
| 0° C. (ft-lb/in | 0.4 | 0.5 | 1.1 | 0.8 | 0.9 | 0.9 | 1.1 | 0.6 | 0.7 | 0.9 | 1 |

TABLE II-continued

| | | | | | | | | | | | |
|---|---|---|---|---|---|---|---|---|---|---|---|
| Gardner Impact Strength (in-lb) | <10 | 130 | 155 | 110 | 96 | 100 | 100 | 160 | 200 | 240 | >320 |
| Stress Whitening Resistance (in) | <0.1 | <0.1 | 0.69 | <0.1 | <0.1 | <0.1 | <0.1 | <0.1 | <0.1 | <0.1 | <0.1 |
| Rockwell Hardness, R scale | 97 | 90 | 84 | 87 | 82 | 78 | 73 | 86 | 82 | 76 | 77 |

| Example | 23 | 24 | 25 | 26 | 27 | 28 | 29 | 30 | 31 | 32 |
|---|---|---|---|---|---|---|---|---|---|---|
| Isotactic Polypropylene (%) | — | — | — | — | — | — | — | — | 90 | 80 |
| In Situ Copolymer (%) | — | — | — | — | — | — | — | — | — | — |
| Impact Polypropylene Copolymer (%) | 95 | 90 | 85 | 80 | 95 | 90 | 85 | 80 | — | — |
| VLDPE (%) | 5 | 10 | 15 | 20 | 5 | 10 | 15 | 20 | 10 | 20 |
| Properties | | | | | | | | | | |
| Melt Flow (g/10 min) | 3.5 | 3.4 | 3.3 | 3.2 | 3.7 | 3.7 | 3.6 | 3.6 | 9.5 | 7.4 |
| Secant Flexural Modulus (psi × $10^{-5}$) | 1.46 | 1.34 | 1.26 | 1.14 | 1.39 | 1.3 | 1.15 | 0.98 | 1.98 | 1.64 |
| Notched Izod - 23° C. (ft-lb/in) | 1.3 | 1.3 | 1.6 | 2 | 1.7 | 1.8 | 2.7 | 8.6 | 0.8 | 0.9 |
| 0° C. (ft-lb/in) | 0.7 | 0.8 | 0.9 | 0.9 | 0.9 | 1.1 | 1.1 | 1.5 | 0.5 | 0.6 |
| Gardner Impact Strength (in-lb) | 110 | 100 | 80 | 80 | 145 | 120 | 210 | >320 | 120 | 300 |
| Stress Whitening Resistance (in) | <0.1 | <0.1 | <0.1 | <0.1 | 0.3 | 0.37 | 0.4 | 0.4 | 0.34 | 0.34 |
| Rockwell Hardness, R scale | 88 | 80 | 80 | 75 | 83 | 75 | 71 | 52 | — | — |

Notes to Tables:
1. Melt Flow is given in grams per 10 minutes or decigrams per minute. It is determined under ASTM D-1238, at 230° C. with a 2.16 kilogram load.
2. Secant Flexural Modulus is given in pounds per square inch × $10^{-5}$, and is determined under ASTM D-790, Method A (0.05 inch per minute draw rate; Modulus measured at 1% strain).
3. Notched Izod can also be referred to as Notched Izod Impact Strength. It is determined under ASTM D-256 and is given in foot pounds per inch.
4. Gardner Impact Strength is given in inch-pounds, and is determined under ASTM D-3029, Condition G, at minus 30° C.
5. Stress Whitening Resistance is given in inches. It is determined by measuring the average diameter of the stress whitened area 24 hours after an impact of 10 inch-pounds. ASTM D-3029, Condition G, is followed with the sample support ring removed.
6. Tensile Yield Strength is determined under ASTM D-638 at a draw rate of 2 inches per minute. The result is given in pounds per square inch.
7. Tensile Yield Elongation is determined under ASTM D-638 at a draw rate of 2 inches per minute. The result is given in percent.
8. Vicat Softening Point is determined under ASTM D-1515 and is given in degrees Centigrade.
9. Rockwell Hardness is determined under ASTM D-785, R Scale.
10. Specular Gloss is determined under ASTM D-523 at a 60° angle using an injection molded specimen, and is given in percent.
11. Copolymer Fraction is the weight percent of copolymer produced in the second reactor based on the weight of the matrix plus copolymer. It is measured by infrared spectrophotometric determination.
12. DSC m.p., i.e, DSC melting point, is given for PE (polyethylene) and PP (polypropylene) in degrees Centigrade. It is determined under ASTM D-3417 and ASTM D-3418. PE is the endotherm peak associated with the melting of polyethylene crystallinity and PP is the endotherm peak associated with the melting of polypropylene crystallinity. ΔH PE is the energy required to melt the polyethylene crystalline fraction, and is given in calories per gram.
13. In examples 15 to 22, 31, and 32, the VLDPE has a melt index of 1; a density of 0.905 gram per cubic centimeter; a weight percent of ethylene of 87; and an Mw/Mn of 3 to 4. In examples 23 to 26, the VLDPE has a melt index of 0.5; a density of 0.900 gram per cubic centimeter; a weight percent of ethylene of 86; and an Mw/Mn of 6 to 8. In examples 27 to 30, the VLDPE has a melt index of 1.3; a density of 0.884 gram per cubic centimeter; a weight percent of ethylene of 80; and an Mw/Mn of 3 to 4.
14. Melt index is determined under ASTM D-1238 at 190° C. under a 2.16 kilogram load.
15. Mw/Mn is discussed above. It is determined by size exclusion chromatography.
16. The composition in examples 12 to 32 is given in percent by weight based on the weight of the recited components.
17. Isotactic Polypropylene is a homopolymer of propylene having a melt flow of 15 and an isotacticity of 96 percent.
18. In Situ Copolymer is a commercial impact polypropylene copolymer prepared in two reactors.
19. Impact Polypropylene Copolymer is prepared in accordance with Examples 1 to 11.
20. In examples 15 to 18 and 27 to 30, each blend is a mixture of dry pellets, which is injection molded.
21. In examples 19 to 26, the components are melt blended prior to injection molding. It is noted that better properties are obtained if the components are melt blended.
22. It is also noted that the highest Notched Izod is obtained with the 80/20 blend.

I claim:

1. A non-crosslinked, melt blend consisting essentially of;
   (a) an isotactic polypropylene matrix containing an ethylene/propylene copolymer dispersed phase, said combination having dual melting peaks, a first peak in the range of about 150° C. to about 165° C. attributable to the matrix, and a second peak in the range of about 123° C. to about 132° C. having at least about 2.2 calories per gram melting endotherm, attributable to the copolymer, component (a) being formed sequentially in situ and being present in the blend in an amount of about 60 to about 90 percent by weight based on the weight of the blend; and
   (b) an ethylene/1-butene copolymer containing about 85 to about 90 percent by weight ethylene; having a density in the range of about 0.890 to about 0.908 gram per cubic centimeter; and having an Mw/Mn ratio of up to about 8, component (b) being present in the blend in an amount of about 10 to about 40 percent by weight based on the weight of the blend.

2. The blend defined in claim 1 wherein component (a) is present in an amount of about 75 to about 85 percent by weight and component (b) in an amount of about 15 to about 25 percent by weight.

3. The blend defined in claim 1 wherein the isotactic polypropylene is a homopolymer of propylene or a copolymer of propylene and one or more alpha-olefins.

4. The blend defined in claim 1 wherein the second peak has a melting point in the range of about 125° C. to about 130° C.

5. The blend defined in claim 1 wherein the second peak has a melting endotherm of at least about 3 calories per gram.

6. The blend defined in claim 1 wherein component (b) is based on one or more additional alpha-olefins and/or diolefins.

7. The blend defined in claim 1 wherein component (b) has a density in the range of about 0.895 to about 0.908 gram per cubic centimeter.

8. The blend defined in claim 1 wherein the Mw/Mn ratio is no greater than about 4.

9. A non-crosslinked, melt blend consisting essentially of
   (a) an isotactic homopolymer of propylene or a copolymer of propylene and one or more alpha-olefins having 2 or 4 to 8 carbon atoms, as matrix, containing an ethylene/propylene copolymer dispersed phase, said combination having dual melting peaks, a first peak in the range of about 150° C. to about 165° C., attributable to the matrix, and a second peak in the range of about 123° C. to about 132° C. having at least 2.2 calories per gram melting endotherm, attributable to the copolymer, component (a) being formed sequentially in situ and being present in the blend in an amount of about 75 to about 85 percent by weight based on the weight of the blend; and (b) an ethylene/1-butene copolymer containing at least about 85 percent by weight ethylene; having a density in the range of about 0.895 to about 0.908 gram per cubic centimeter; and having an Mw/Mn ratio of no greater than about 4, component (b) being present in the blend in an amount of about 15 to about 25 percent by weight based on the weight of the blend.

10. A rigid article molded from the blend defined in claim 1.

11. A rigid article molded from the blend defined in claim 10.

* * * * *